Jan. 1, 1946.  F. H. SQUIRES  2,392,008
BOAT LOADING DEVICE
Filed Nov. 13, 1944
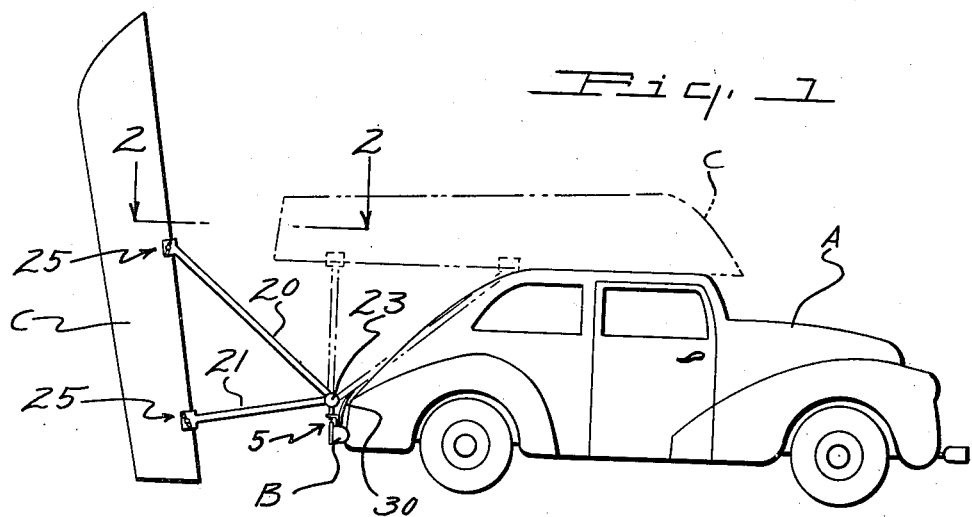
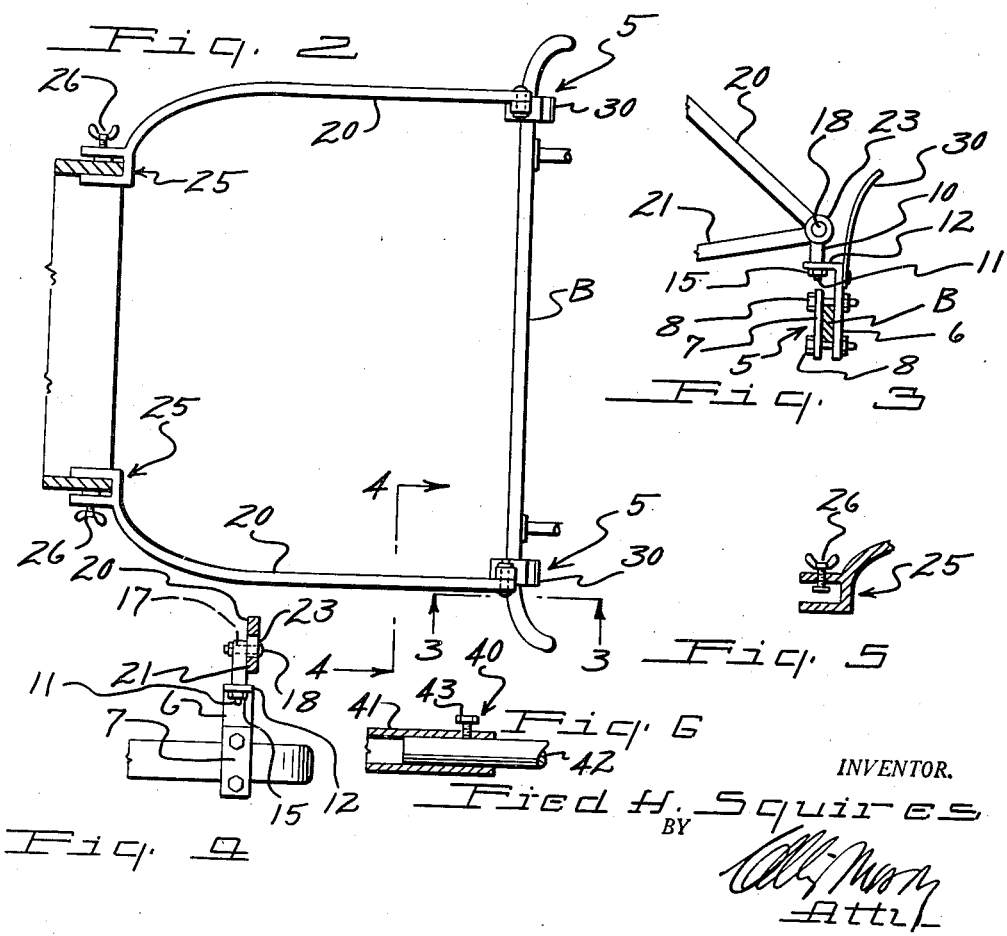
INVENTOR.
Fred H. Squires Patented Jan. 1, 1946

2,392,008

UNITED STATES PATENT OFFICE 2,392,008

BOAT LOADING DEVICE

Fred H. Squires, Los Angeles, Calif., assignor to Western Plastics, Incorporated, Glendale, Calif., a corporation of California Application November 13, 1944, Serial No. 563,272

4 Claims. (Cl. 214—77)

My invention has to do with boat loading devices and relates more particularly to devices for loading boats onto and unloading them from the tops of automobiles and the like.

A long existing difficulty experienced by those such as hunters and fishermen, who transport boats to and from the place of use by mounting them atop automobiles, has been the tremendous effort necessary to effect the loading and unloading of the boat, a job usually requiring the effort of several men and even then it frequently happens that the automobile body or the boat, or both, are damaged in the effort.

It is therefore among the objects of my invention to provide a simple and economical device for easily accomplishing the loading of a boat onto or the unloading of a boat from an automobile body or top with a minimum of time and effort.

Another object is the provision of a device of this character which may be readily attached to or detached from a vehicle.

My invention possesses other more subordinate advantages which will become apparent from the following detailed explanation of one of its specific embodiments which I have chosen for explanatory purposes. I wish it understood, however, that, in its broader aspects as defined by the accompanying claims, the invention is not to be confined to the details of structure now to be described since it is capable of being embodied in other physical forms. For purposes of the following description I shall refer to the accompanying drawing, in which:

Fig. 1 is a side elevation showing my device in use;

Fig. 2 is a plan view taken somewhat on line 2—2 of Fig. 1;

Fig. 3 is an enlarged fragmentary view taken on line 3—3 of Fig. 2;

Fig. 4 is an enlarged fragmentary view taken on line 4—4 of Fig. 2;

Fig. 5 is an enlarged fragmentary view of the outer end portion of either of the arms of the device; and Fig. 6 is a fragmentary enlarged sectional view showing a modified form of arm having longitudinal extensibility.

Referring now to the drawing I show for illustrative purposes a conventional automobile A having the usual rear bumper B and show a boat C.

My loading and unloading device comprises a pair of clamps or brackets generally designated 5 for attachment to the rear bumper and each consisting of an angle iron 6 and a plate 7 between which I clamp the bumper B by means of bolts 8. A post 10 has a reduced diameter threaded lower end portion 11 which is passed through a hole in the top arm 12 of the angle iron member and is secured thereon by a nut 15, both of the clamps 5 being of the construction described.

Adjacent its top end each post 10 has a transverse hole 17 through which a pivot pin 18 passes to pivotally mount the hub portion 23 from which the radial arms 20, 21 radiate, the pin passing through the hub portion. While I show the arms 20, 21 as being of bar steel, they may be made of any suitable material. The lower arm 21 of each pair of arms is shorter than the top arm 20 and is of such length that when it is swung into position perpendicular to the bumper the boat to which it is attached will be in substantially a horizontal position as shown in dot-dash lines in Fig. 1. Both arms curve inwardly towards their outer ends as shown in Fig. 2.

At the outer end of each of the arms 20, 21 of each bar I provide means for securing the arms to the gunwales of the boat C. While any suitable means may be provided for this purpose, I here show each of the arms terminating in what in effect is a C-clamp 25, having a screw 26 for securing the C-clamp to the boat gunwales.

To load a boat onto the top of an automobile, the boat is first manually lifted into the substantially upright position shown in Fig. 1 by standing the boat on its end and the C-clamps of the arms are secured to the gunwales; or the arms may be detached from the posts by removing the pins 18 and, after having the C-clamps attached to the boat, the arms may be again pivotally mounted on the posts by reinserting the pins 18. In either event, after the boat is so attached to the arms and the arms are pivotally secured to the clamps or brackets 5, the boat may be readily elevated and placed on the top of the automobile by swinging the arms about the arc of the radius defined by the arms. To unload the boat, the arms may be swung in the opposite direction.

To cushion the landing of the boat atop the car I provide a pair of leaf springs 30 (one for each clamp 5) whose lower ends are secured to the respective angle irons 6 and which extend upwardly in the path of the arms 20, being positioned to be engaged by those arms slightly before the arms reach the dot-dash line position of Fig. 1.

The boat may be secured to the top of the car after being loaded in any of the well-known manners.

In some instances it may be desirable to provide longitudinal adjustability to the arms to adapt the device to automobiles of different heights and in Fig. 6 I show a modification wherein each of the arms is longitudinally adjustable. Here each arm 40 is composed of two telescopic tubular sections 41, 42 which may be secured in any desired position of longitudinal adjustment by means of a set screw 43.

I claim:

1. A device for loading a boat atop a vehicle comprising bracket means adapted to be secured to the lower portion of a vehicle, radius arms pivotally secured at one end to the bracket means for swinging movement in a vertical plane, means carried by the opposite ends of the arms for detachably securing a boat thereto, and spring means carried by the bracket means in position for engagement with the arms to resist movement thereof during only the latter part of their swinging loading movement.

2. A device for loading a boat atop a vehicle having an end bumper, comprising bracket members adapted to be secured to said bumper in horizontally spaced relation to each other, a pair of V-shaped radius members pivotally connected at one end to the respective brackets for swinging movement about an axis transverse of the vehicle, said radius members being inwardly curved adjacent their other ends whereby to clear the sides of the vehicle in their swinging movement, and means on the last-named ends of said members for detachably securing them to the gunwale portions of a boat.

3. A device for loading a boat atop a vehicle having an end bumper, comprising bracket members adapted to be secured to said bumper in horizontally spaced relation to each other, a pair of V-shaped radius members pivotally connected at one end to the respective brackets for swinging movement about an axis transverse of the vehicle, said radius members being inwardly curved adjacent their other ends whereby to clear the sides of the vehicle in their swinging movement, and means on the last-named ends of said members for detachably securing them to the gunwale portions of a boat, said last-named means comprising bifurcations on the radius members and means for clamping said portions of a boat between the bifurcations.

4. A device for loading a boat atop a vehicle having an end bumper, comprising bracket members adapted to be secured to said bumper in horizontally spaced relation to each other, a pair of radius members pivotally connected at one end to the respective brackets for swinging movement about an axis transverse of the vehicle, means on the other ends of the members for securing them to a boat, and means yieldably opposing swinging movement of said members during the latter portion of their loading swinging movement, comprising a pair of upright leaf springs secured at their lower ends to the respective brackets and extending upwardly therefrom into the path of swinging movement of the radius members.

FRED H. SQUIRES.